United States Patent
Cho

(10) Patent No.: US 9,317,906 B2
(45) Date of Patent: Apr. 19, 2016

(54) IMAGE PROCESSING APPARATUS AND METHOD

(71) Applicant: SAMSUNG ELECTRONICS CO., LTD., Suwon-si, Gyeonggi-do (KR)

(72) Inventor: Yang Ho Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/336,465

(22) Filed: Jul. 21, 2014

(65) Prior Publication Data

US 2015/0110414 A1  Apr. 23, 2015

(30) Foreign Application Priority Data

Oct. 22, 2013  (KR) ........................ 10-2013-0125985

(51) Int. Cl.
*G06K 9/40* (2006.01)
*G06T 5/00* (2006.01)
*G06T 3/40* (2006.01)
*H04N 13/00* (2006.01)

(52) U.S. Cl.
CPC . *G06T 5/005* (2013.01); *G06T 3/40* (2013.01); *H04N 13/0022* (2013.01); *H04N 13/0029* (2013.01); *G06T 2207/10021* (2013.01); *G06T 2207/20016* (2013.01); *G06T 2207/20192* (2013.01)

(58) Field of Classification Search
None
See application file for complete search history.

(56) References Cited

U.S. PATENT DOCUMENTS

| 5,613,048 | A | 3/1997 | Chen et al. | |
|---|---|---|---|---|
| 8,284,237 | B2 | 10/2012 | Chen et al. | |
| 2008/0152002 | A1* | 6/2008 | Haque et al. | 375/240.12 |
| 2010/0220932 | A1 | 9/2010 | Zhang et al. | |
| 2011/0081094 | A1* | 4/2011 | Damkat | 382/254 |
| 2011/0304618 | A1 | 12/2011 | Chen et al. | |
| 2012/0105435 | A1 | 5/2012 | Chen et al. | |
| 2012/0120192 | A1 | 5/2012 | Alregib et al. | |
| 2012/0212480 | A1 | 8/2012 | Cho et al. | |

FOREIGN PATENT DOCUMENTS

| JP | 2005-228223 | 8/2005 |
|---|---|---|
| KR | 10-2006-0067238 | 6/2006 |
| KR | 10-2013-0067474 | 6/2013 |

* cited by examiner

*Primary Examiner* — Ali Bayat
(74) *Attorney, Agent, or Firm* — NSIP Law

(57) ABSTRACT

A method and apparatus for processing an image are provided in which an image including a hole region may be downscaled, prior to restoration of a hole pixel. The downscaled hole region may be restored, and a scale of the restored hole region may be converted to an original scale thereof, by upscaling.

20 Claims, 13 Drawing Sheets

IMAGE PROCESSING APPARATUS AND METHOD

CROSS-REFERENCE TO RELATED APPLICATIONS

This application claims the priority benefit of Korean Patent Application No. 10-2013-0125985, filed on Oct. 22, 2013, in the Korean Intellectual Property Office, the disclosure of which is incorporated herein by reference.

BACKGROUND

1. Field

Example embodiments of the following description relate to a technology of processing an image, and more particularly, to a method and apparatus for processing an image with a hole.

2. Description of the Related Art

For a three-dimensional (3D) display, images with various viewpoints may be generated from an input image. When images with various viewpoints are generated based on a limited input image, the generated images may include a region in which information is not included. The region may be called or referred to as an "occlusion region." For example, the region may correspond to a background region covered by a foreground region in the input image.

Because information on a background region is not included in the generated images, a region in which color values are not determined may be represented as a hole region. Accordingly, to provide a user with a natural image, a hole region may be required to be restored.

During restoration of a hole region, a structure characteristic of a background may remain unchanged in a restored hole region, for a natural visual sensitivity to be realized in an image.

SUMMARY

The foregoing and/or other aspects may be achieved by providing an image processing method including downscaling a first image including a first hole region, and generating a second image, the first hole region being converted to a second hole region in the second image by the downscaling of the first image, restoring a value of a first pixel in the second hole region, upscaling the second hole region to a scale of the first hole region, and setting a value of a second pixel in the upscaled second hole region to a value of a third pixel in the first hole region, and generating a third image, the third pixel corresponding to the second pixel.

The image processing method may further include updating the third image by adjusting the value of the third pixel.

The updating may include setting a first block including the third pixel.

The updating may further include searching for a second block that is most similar to the first block from a predetermined search range.

The updating may further include updating the value of the third pixel based on the found second block.

The updating may be performed regardless of structure priority information of the first image.

The image processing method may further include downscaling a first depth information image corresponding to the first image, and generating a second depth information image corresponding to the second image. The first depth information image may include a third hole region corresponding to the first hole region, and the third hole region may be converted to a fourth hole region in the second depth information image by the downscaling of the first depth information image.

The image processing method may further include restoring a depth value of a fourth pixel in the second depth information image. The fourth pixel may correspond to the first pixel.

The image processing method may further include upscaling the fourth hole region to a scale of the third hole region.

The image processing method may further include setting a depth value of a fifth pixel in the upscaled fourth hole region to a value of a sixth pixel in the third hole region, and generating a third depth information image. The sixth pixel may correspond to the fifth pixel.

The image processing method may further include updating the third depth information image by adjusting the value of the sixth pixel.

The image processing method may further include detecting a pixel with a restoration error from among a plurality of pixels in the updated third image, based on the updated third depth information image.

The detecting may include, when a background pixel is located adjacent to a left side or a right side of a seventh pixel in the first hole region, setting a depth value of an eighth pixel in a fourth depth information image to a depth value of the background pixel. The eighth pixel may correspond to the seventh pixel.

The detecting may further include comparing the third depth information image with the fourth depth information image.

The detecting may further include detecting a pixel with a restoration error from among the plurality of pixels in the third image, based on a result of the comparing.

The image processing method may further include improving the detected pixel.

The improving may include replacing a value of the detected pixel by a value calculated based on values of background pixels adjacent to the detected pixel.

The calculated value may include an average value of the values of the background pixels.

The image processing method may further include generating the first image based on at least one input image and a depth information image of the at least one input image.

A viewpoint of each of the at least one input image may be different from a viewpoint of the first image.

The image processing method may further include generating the first image based on a plurality of input images and at least one depth information image.

The at least one depth information image may be estimated based on the plurality of input images.

A viewpoint of each of the plurality of input images may be different from a viewpoint of the first image.

A plurality of first pixels may be provided.

The restoring of the value of the first pixel may include generating a priority for each of the plurality of first pixels.

The restoring of the value of the first pixel may further include restoring values of the plurality of first pixels in a descending order of the priority.

The priority may be determined based on at least one of a visual intensity of a structure including each of the plurality of first pixels, and a depth value of each of the plurality of first pixels.

The plurality of first pixels may be included in a patch.

The restoring of the value of the first pixel may include restoring a value of each of the plurality of first pixels in a unit of the patch.

The foregoing and/or other aspects may be achieved by providing an image processing apparatus including a scale converter to downscale a first image including a first hole region, to generate a second image, and to upscale a second hole region in the second image to a scale of the first hole region, the first hole region being converted to the second hole region by the downscaling of the first image, a restoring unit (restorer) to restore a value of a first pixel in the second hole region, and a blending unit to set a value of a second pixel in the upscaled second hole region to a value of a third pixel in the first hole region, and to generate a third image, the third pixel corresponding to the second pixel.

The image processing apparatus may further include an image updating unit (image updater) to update the third image by adjusting the value of the third pixel.

The scale converter may downscale a first depth information image corresponding to the first image, may generate a second depth information image corresponding to the second image, and may upscale a fourth hole region in the second depth information image to a scale of a third hole region in the first depth information image. The third hole region may correspond to the first hole region, and may be converted to the fourth hole region by the downscaling of the first depth information image.

The restoring unit may restore a depth value of a fourth pixel in the second depth information image. The fourth pixel may correspond to the first pixel The blending unit (blender) may set a depth value of a fifth pixel in the upscaled fourth hole region to a value of a sixth pixel in the third hole region, and may generate a third depth information image. The sixth pixel may correspond to the fifth pixel.

The image updating unit may update the third depth information image by adjusting the value of the sixth pixel.

The image processing apparatus may further include a restoration error detector. The restoration error detector may detect a pixel with a restoration error from among a plurality of pixels in the updated third image, based on the updated third depth information image.

When a background pixel is located adjacent to a left side or a right side of a seventh pixel in the first hole region, the restoration error detector may set a depth value of an eighth pixel in a fourth depth information image to a depth value of the background pixel. The eighth pixel may correspond to the seventh pixel.

The restoration error detector may compare the third depth information image with the fourth depth information image, and may detect a pixel with a restoration error from among the plurality of pixels in the third image, based on a result of the comparison, the eighth pixel corresponding to the seventh pixel The image processing apparatus may further include a restoration error improving unit (restoration error improver) to replace a value of the detected pixel by a value calculated based on values of background pixels adjacent to the detected pixel.

The image processing apparatus may further include an image generator to generate the first image based on at least one input image and a depth information image of the at least one input image.

A viewpoint of each of the at least one input image may be different from a viewpoint of the first image.

The foregoing and/or other aspects may be achieved by providing an image processing method including: receiving an input image, generating a first image having a viewpoint different from a viewpoint of the input image, the first image including a first hole region, generating a second image by downscaling the first image and converting the first hole region to a second hole region, restoring a second hole pixel in the second hole region based on background information of a background region disposed adjacent to the second hole region, upscaling the second hole region in the second image, and generating a third image which includes the first hole region, wherein the first hole region of the third image is restored by changing a value of a first hole pixel in the first hole region of the third image to a value of an upscaled hole pixel in the upscaled second hole region, the upscaled hole pixel having a same coordinate value as the first hole pixel.

The restoring the second hole pixel may be performed by setting a priority for restoration for hole pixels in the second hole region, and restoring hole pixels in the second hole region according to the set priority and information of a structure of the background region. The priority of the hole pixels in the second hole region may be based on at least one of a depth value of the hole pixels in the second hole region and a visual intensity of a structure including the hole pixels in the second hole region.

In an embodiment only the second hole region may be upscaled in the second image.

The image processing method may further include increasing a resolution of the third image by adjusting a value of at least one pixel in the restored first hole region by changing a value of the at least one pixel in the restored first hole region to a value of a pixel disposed in a block of pixels in the third image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
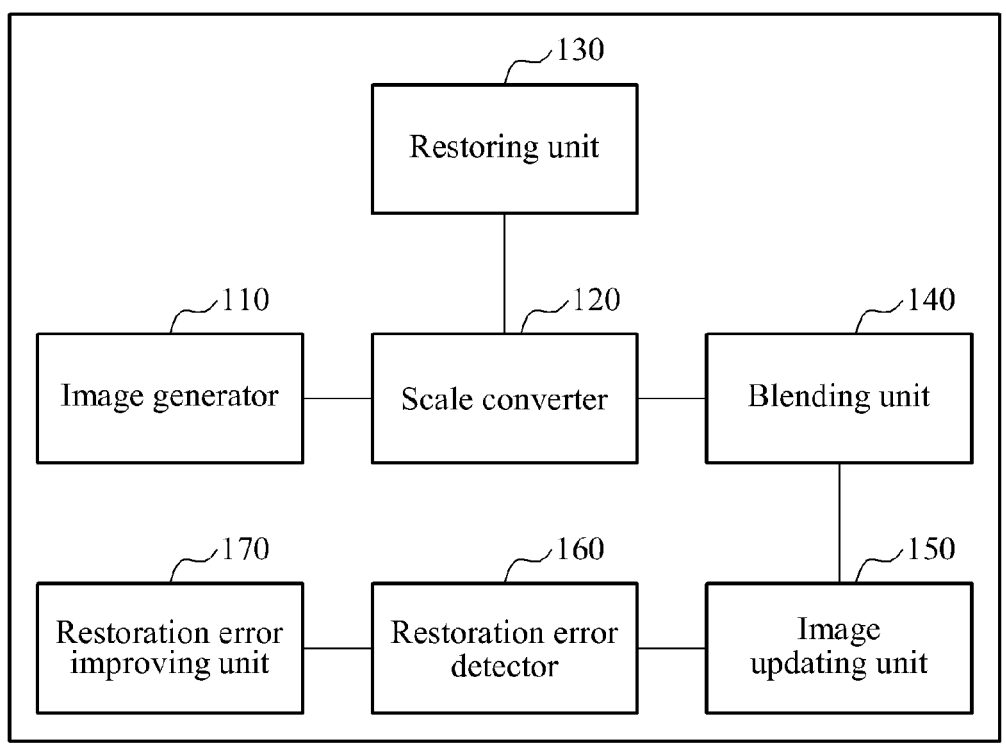
FIG. 1 illustrates a block diagram of a configuration of an image processing apparatus according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

A hole pixel may refer to a pixel representing a hole. A pixel may include at least one of a color value and a depth value. The hole pixel may refer to a pixel that does not include at least one of a color value and a depth value.

Hole restoration may be used to estimate and set missing information, or allocate the missing information to a hole pixel. Hole restoration may enable a hole pixel to be a non-hole pixel. The terms "hole restoration" may be replaced, or alternatively referred to as, for example, by "hole filling" or "restoration for a hole." That is, these terms may be used interchangeably.

A hole region may refer to a region including at least one hole pixel. A part or all of the pixels in a hole region may be referred to as hole pixels. Restoration of a hole region may refer to restoration of a part or all of the hole pixels in the hole region. The term "restoration of a hole region" may be replaced, or alternatively referred to as, for example, by "filling of a hole region" or "restoration for a hole region." That is, these terms may be used interchangeably.

FIG. 1 illustrates a block diagram of a configuration of an image processing apparatus 100 according to example embodiments.

The image processing apparatus 100 of FIG. 1 may include an image generator 110, a scale converter 120, a restoring unit 130, a blending unit 140, an image updating unit 150, a restoration error detector 160, and a restoration error improving unit 170.

The image generator 110, the scale converter 120, the restoring unit 130, the blending unit 140, the image updating unit 150, the restoration error detector 160, and the restoration error improving unit 170 will be further described with reference to FIGS. 2 through 13.

Figure 2:
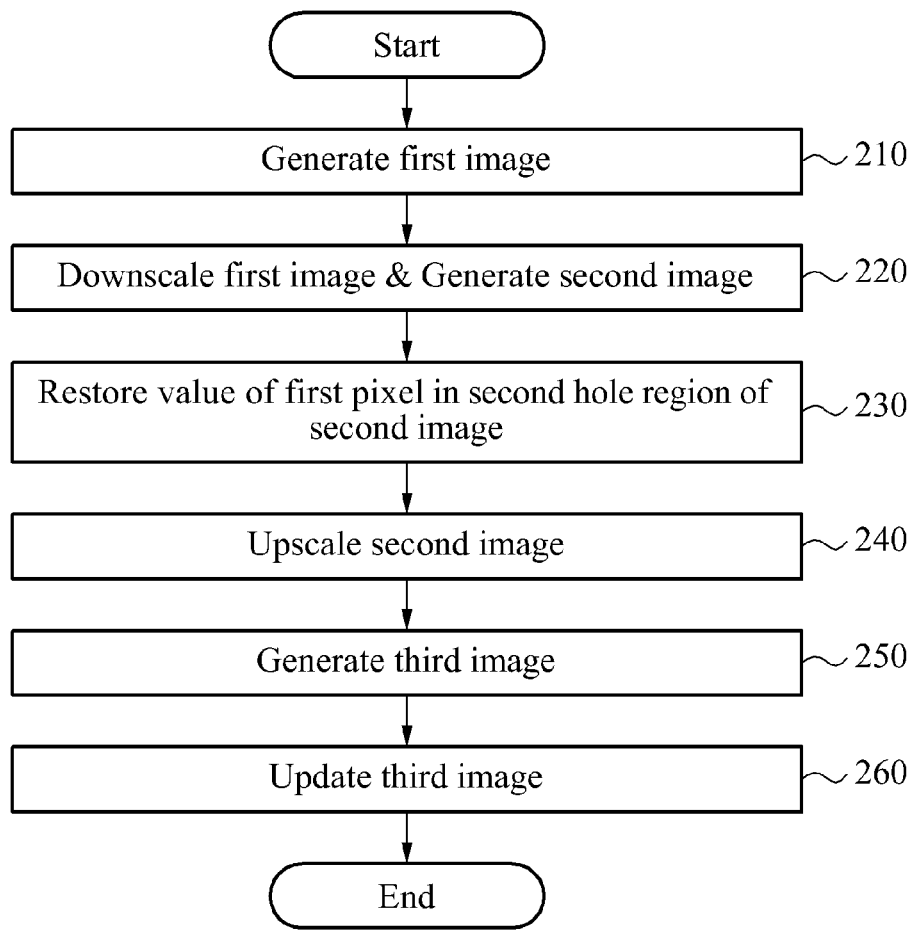
FIG. 2 illustrates a flowchart of an image processing method according to example embodiments.

FIG. 2 illustrates a flowchart of an image processing method according to example embodiments.

Referring to FIG. 2, in 210, the image generator 110 may generate an image with a viewpoint that is different from a viewpoint of an input image.

The input image may include, for example, an image input to the image processing apparatus 100, or an image stored in the image processing apparatus 100.

Hereinafter, the image generated in 210 at the viewpoint different from the viewpoint of the input image may be referred to as a "first image." The first image may include pixels that each have, for example, an x-coordinate value and a y-coordinate value.

The viewpoint of the first image generated by the image generator 110 may be different from the viewpoint of the input image. Accordingly, the first image may include hole regions. One of the hole regions in the first image may be called a "first hole region." Each of the hole regions may include at least one hole that does not have a pixel value. Hereinafter, a pixel corresponding to a hole may be briefly referred to as a "hole pixel."

The image generator 110 may generate a first depth information image corresponding to the first image. The first image may be, for example, an image representing a color value of a pixel in the image. The first depth information image may be, for example, an image representing a depth value of a pixel in the image. A first view may include the first image and the first depth information image. Pixels with the same coordinate values in the first image and the first depth information image may correspond to each other.

The image generator 110 and the first image will be further described with reference to FIGS. 3 through 5 below.

In 220, the scale converter 120 may downscale the first image, and may generate a second image. By downscaling the first image, the first hole region may be converted to a second hole region in the second image.

The second hole region generated by the downscaling may be smaller in size than the first hole region. A single pixel in the second hole region may correspond to a plurality of pixels in the first hole region. For example, the plurality of pixels may be arranged in a rectangular shape. However, the plurality of pixels in the first hole region need not be in a rectangular shape, and may be arranged in a different shape, for example, a substantially circular shape, a substantially triangular shape, a square shape, or any other polygonal or geometric shape, which may include irregular shapes.

The scale converter 120 and the second image will be further described with reference to FIG. 6 below.

In 230, the restoring unit 130 may restore a value of a first pixel in the second hole region of the second image. The first pixel may be, for example, a single hole pixel among one or more hole pixels in the second hole region.

The first pixel may be, for example, a hole pixel. The restoring unit 130 may restore a value of each of the hole pixels in the second hole region. The second hole region may be restored, for example, based on background information of a background region adjacent to the second hole region.

The restoring unit 130, and an operation of restoring the value of the first pixel will be further described with reference to FIG. 7 below.

In 240, the scale converter 120 may upscale the second image, and may generate an upscaled second image. The scale converter 120 may upscale a portion or all portions of the second image.

The scale converter 120 may upscale a portion of the second image, for example, the second hole region, to a scale of the first hole region. The scale of the first hole region may refer to a size of the first hole region.

The upscaling of the second hole region will be further described with reference to FIG. 8 below.

In 250, the blending unit 140 may set a value of a second pixel in the upscaled second hole region to a value of a third pixel in the first hole region, and may generate a third image. The third pixel may be, for example, a hole pixel. The value of the third pixel may be restored through the setting.

The second pixel in the upscaled second hole region may correspond to the third pixel in the first hole region. Corresponding pixels may refer to pixels with the same coordinate values among pixels in the upscaled second hole region and the first hole region.

The blending unit 140, and the generating of the third image will be further described with reference to FIG. 8 below.

In 260, the image updating unit 150 may update the third image.

The updating of the third image may refer to adjusting or changing a value of a restored pixel in the third image.

The image updating unit 150, and the updating of the third image will be further described with reference to FIG. 9 below.

Figure 3:
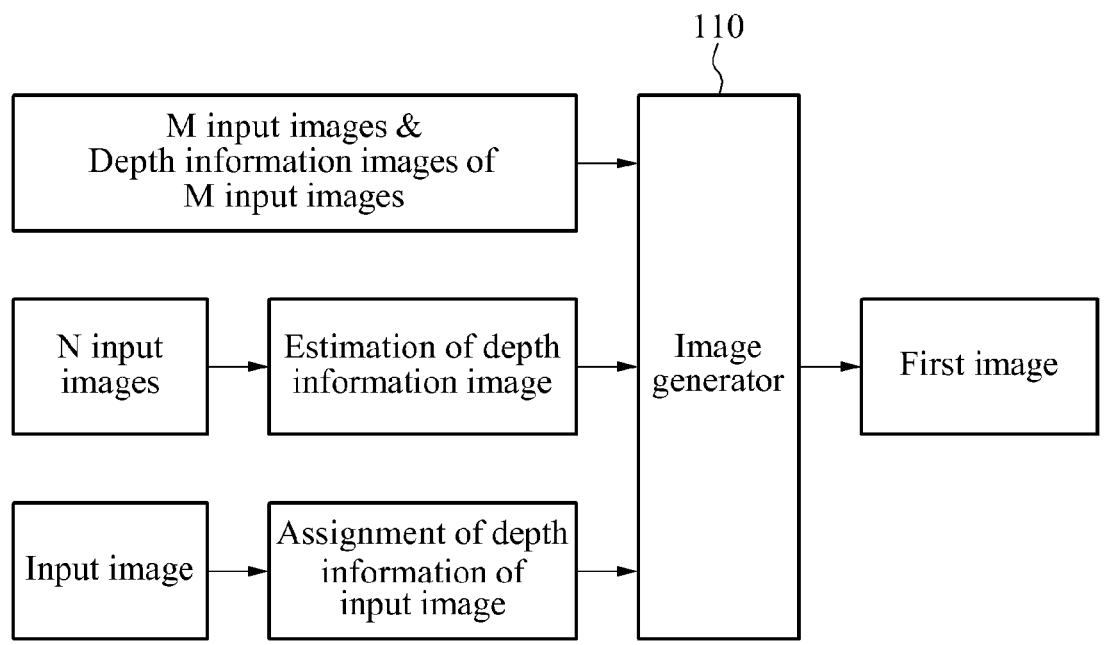
FIG. 3 illustrates a diagram of an operation of generating a first image according to example embodiments.

FIG. 3 illustrates a diagram of an operation of generating a first image according to example embodiments.

The image generator 110 may generate a first image, based on at least one input image, and a depth information image of the at least one input image.

A viewpoint of each of the at least one input image may be different from a viewpoint of the first image.

In an example, when "M" input images, and "M" depth information images are provided, the image generator 110 may generate a first image, based on the "M" input images and the "M" depth information images. In this example, a viewpoint of the first image may be different from a viewpoint of each of the "M" input images, and "M" may be an integer that is equal to or greater than "2."

In another example, when "N" input images are provided, the image generator 110 may estimate at least one depth information image, based on the "N" input images. The image generator 110 may generate a first image, based on the "N" input images, and the estimated at least one depth information image. In this example, a viewpoint of the first image may be different from a viewpoint of each of the "N" input images, and "N" may be an integer that is equal to or greater than "2."

In still another example, when a single input image is provided, the image generator 110 may allocate depth values of pixels in a depth information image of the single input image, based on the single input image. The image generator 110 may set the depth values of the pixels in the depth information image to predetermined values. The predetermined values may be determined by a user of the image processing apparatus 100. The image generator 110 may generate a first image, based on the single input image, and the allocated depth values. In this example, a viewpoint of the first image may be different from a viewpoint of the single input image.

Figure 4:
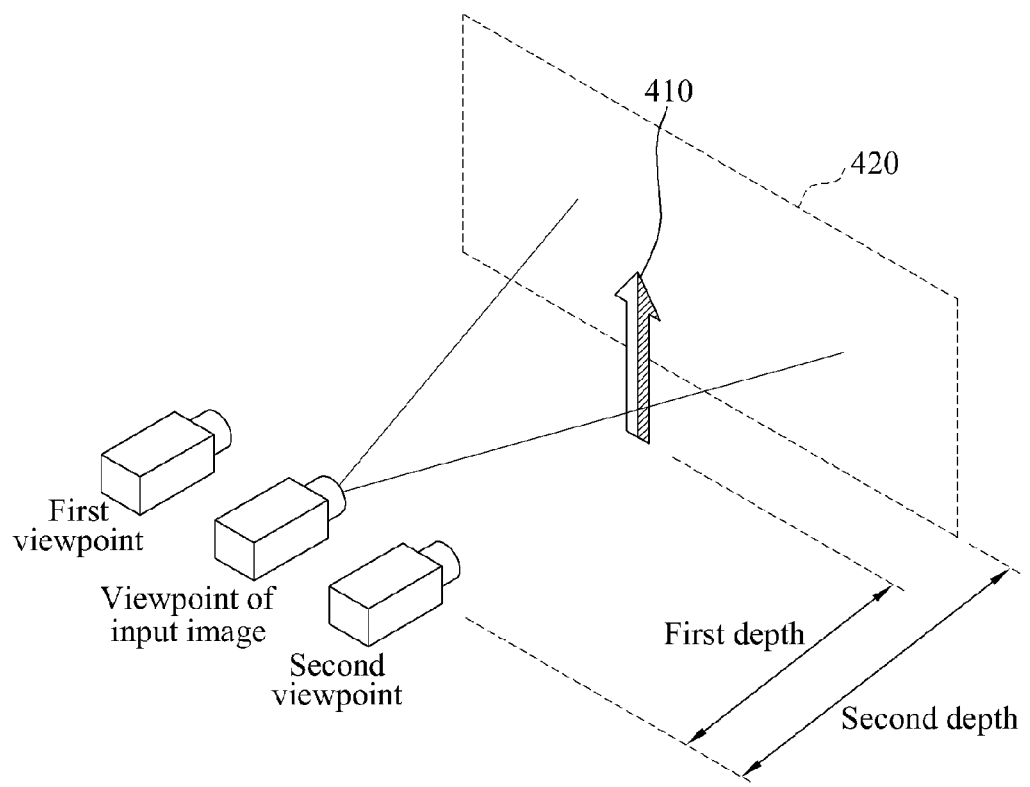
FIG. 4 illustrates a diagram of a viewpoint of an input image, and viewpoints different from the viewpoint of the input image according to example embodiments.

FIG. 4 illustrates a diagram of a viewpoint of an input image, and viewpoints different from the viewpoint of the input image according to example embodiments.

In FIG. 4, a foreground 410 and a background 420 may be captured from the viewpoint of the input image. The input image may be captured from the viewpoint of the input image (e.g., an image capturer such as a camera may be positioned between the first viewpoint and second viewpoint).

In the input image, a depth value of a pixel in the foreground 410 may represent a first depth, and a depth value of a pixel in the background 420 may represent a second depth.

A first image that is to be generated by the image generator 110 may correspond to an image captured from a first viewpoint or a second viewpoint. A viewpoint of the first image may be either the first viewpoint, or the second viewpoint.

Figure 5:
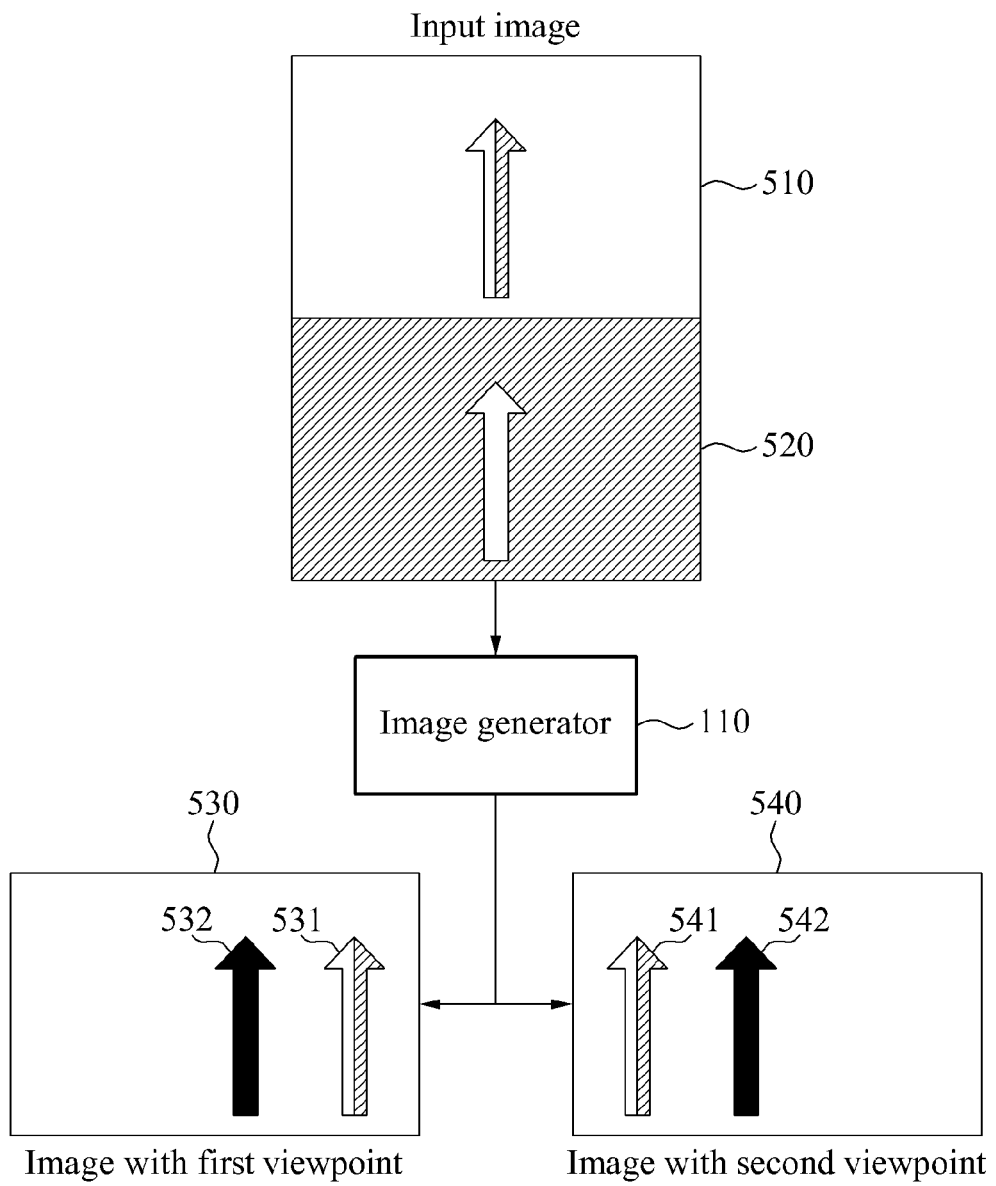
FIG. 5 illustrates a diagram of images with different viewpoints according to example embodiments.

FIG. 5 illustrates a diagram of images with different viewpoints according to example embodiments.

Referring to FIG. 5, an input image 510 and a depth information image 520 of the input image 510 may be provided to the image generator 110.

The image generator 110 may generate an image 530 with a first viewpoint, and an image 540 with a second viewpoint, based on the input image 510 and the depth information image 520. The images 530 and 540 may be referred to as first images. For example, a plurality of first images may be generated. When a plurality of first images are generated, each of the images 530 and 540 may be one of the plurality of first images. Additionally, each of hole regions 532 and 542 may be one of a plurality of first hole regions.

For example, the first viewpoint may be located or positioned at a left side of a viewpoint of the input image 510.

A foreground 531 of the image 530 may be obtained by capturing a left side of the foreground 410 of FIG. 4, compared to a foreground of the input image 510.

The hole region 532 of the image 530 may not have a pixel value. The hole region 532 may correspond to a background covered by the foreground of the input image 510. Since the first viewpoint is located to the left side of the viewpoint of the input image 510, the hole region 532 may appear at a left side of the foreground 531.

The second viewpoint may be located or positioned at a right side of the viewpoint of the input image 510.

In the image 540, the hole region 542 may appear at a right side of a foreground 541.

Figure 6:
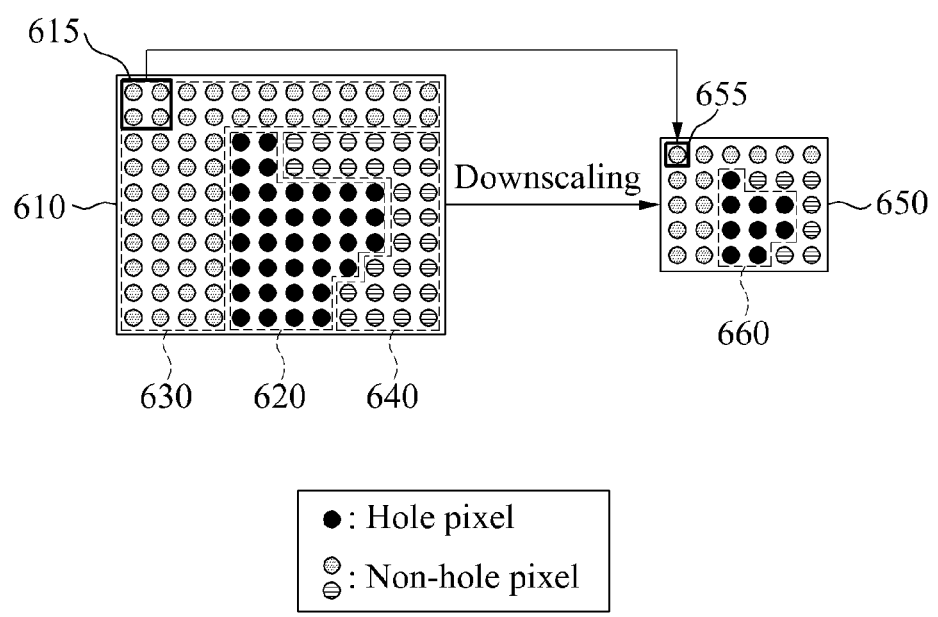
FIG. 6 illustrates a diagram of a first image, and a second image generated by downscaling the first image according to example embodiments.

FIG. 6 illustrates a diagram of a first image, and a second image generated by downscaling the first image according to example embodiments.

Referring to FIG. 6, a first image 610 may include a first hole region 620 including hole pixels, and non-hole regions 630 and 640 including non-hole pixels.

Each of the non-hole regions 630 and 640 may be, for example, either a foreground region, or a background region.

The scale converter 120 may downscale the first image 610, and may generate a second image 650. By downscaling the first image 610, the first hole region 620 may be converted to a second hole region 660 in the second image 650.

Additionally, because of or as a result of the downscaling, pixels 615 in the first image 610 may be converted to a pixel 655 (e.g., a single pixel) in the second image 650. By the converting, the pixel 655 may correspond to the pixels 615. A number of pixels, for example the pixels 615, corresponding to a single pixel, for example the pixel 655, may be determined based on a downscaling ratio. The number of pixels may be obtained by multiplying a ratio of x-axes and a ratio of y-axes in downscaling. For example, in FIG. 6, a non-hole region of 2×2 pixels may be multiplied by a ratio of 1/2 in each of the x and y axes, to downscale the non-hole region to a single pixel.

A value of the pixel 655 may be determined based on values of the pixels 615. For example, the value of the pixel 655 may be an average value or an intermediate value (e.g., a median value) of the values of the pixels 615.

The value of the pixel 655 may be determined preferentially based on values of predetermined pixels among the pixels 615 corresponding to the pixel 655. For example, when at least one of the pixels 615 corresponding to the pixel 655 is included in a hole region, the pixel 655 may be determined to be a hole pixel.

Figure 7:
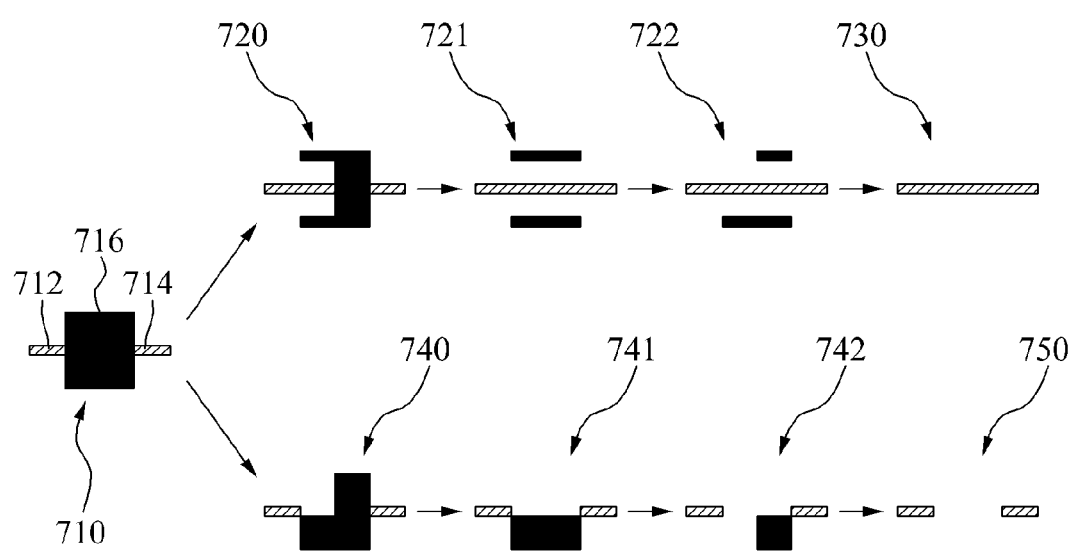
FIG. 7 illustrates a diagram of an image with a hole region restored based on structure priority information, and an image with a hole region restored regardless of structure priority information according to example embodiments.

FIG. 7 illustrates a diagram of an image with a hole region restored based on structure priority information, and an image with a hole region restored regardless of structure priority information according to example embodiments.

The restoring unit 130 may restore the value of the first pixel in the second hole region of the second image. The restoring unit 130 may restore a value of each of a part or all of the hole pixels in the second hole region.

A plurality of hole pixels in the second hole region may be restored. To naturally match a result of the restoring, that is, the restored second hole region to a background region adjacent to the second hole region, information of a main structure of the background region may need to remain unchanged in the restored second hole region. To restore the second hole region while maintaining the information, the restoring unit 130 may set a priority for restoration of each of the hole pixels in the second hole region, and may preferentially restore hole pixels associated with information of a structure of the background region.

The restoring unit 130 may generate a priority for each of a plurality of hole pixels. The priority may be determined, based on at least one of a depth value of a hole pixel to which a priority is to be assigned, and a visual intensity of a structure including the hole pixel.

Prior to restoration of a hole pixel, a value of the hole pixel may not be specified. A part or all of the pixels located around the hole pixel may be non-hole pixels, despite the value of the hole pixel not being determined. The pixels located around the hole pixel may include, for example, pixels adjacent to the hole pixel, pixels neighboring the hole pixel, pixels within a predetermined distance from the hole pixel, or pixels in a predetermined region including the hole pixel. The predetermined region may have a rectangular shape or a circular shape, or some other geometric shape which may be regularly or irregularly shaped. A structure may include the hole pixel, and non-hole pixels around the hole pixel. A visual intensity of the structure may be estimated, determined, or calculated by the non-hole pixels.

A visual intensity of a structure may be determined based on structure priority information of the first image. When a structure represents a corner, a texture, or an edge, a visual intensity of the structure may have a relatively high value.

A depth value of a hole pixel to which a priority is to be assigned may be estimated, determined, or calculated, based on whether pixels located around the hole pixel are included in a foreground region or a background region. In an example, when a large number or all of the pixels located around the hole pixel are included in the foreground region, the depth value of the hole pixel may be set to a value indicating the foreground region. When a large number or all of the pixels are included in the background region, the depth value of the hole pixel may be set to a value indicating the background region. In another example, when at least one of the pixels are included in the foreground region, the depth value of the hole pixel may be set to a value indicating the foreground region. When at least one of the pixels are included in the background region, the depth value of the hole pixel may be set to a value indicating the background region.

Additionally, the depth value of the hole pixel may be determined based on depth values of the pixels located around the hole pixel. For example, the depth value of the hole pixel may be a minimum value, an intermediate or median value, an average value, or a maximum value, among the depth values of the pixels.

The restoring unit 130 may assign a higher priority to a hole pixel, when a fewer number of patches have a pattern that is similar to or identical to a pattern of a patch including the hole pixel, in a region adjacent to the hole pixel. For example, the restoring unit 130 may assign a higher priority to a hole pixel in a rarer patch in an image, so that the rarer patch may be preferentially restored.

A patch may refer to a region having a predetermined scope. The patch may have a circular shape, a rectangular shape, and the like. A patch of a hole pixel may refer to a patch including the hole pixel, that is, a patch may refer to a block of pixels including the hole pixel in a center of the block. For example, when a hole pixel is located near an edge of an image, a patch of the hole pixel may include the hole pixel, and may refer to a block attached to the edge.

For example, when a number of patches having a first identical pattern is less than a number of patches having a second identical pattern, the restoring unit 130 may assign a higher priority to a first hole pixel, rather than a second hole pixel. The patches having the first identical pattern may refer to patches that have a pattern similar to or identical to a pattern of a first patch including the first hole pixel, and that are included in a region adjacent to the first hole pixel. The patches having the second identical pattern may refer to patches that have a pattern similar to or identical to a pattern of a second patch including the second hole pixel, and that are included in a region adjacent to the second hole pixel. The region may correspond to a predetermined region or all regions of the second image. For example, the predetermined region may be a circular region or a rectangular region in which the a hole pixel is located in a center of the region. However the disclosure is not so limited and the predetermined region may have different shapes.

The restoring unit 130 may assign a generated priority to each of a plurality of pixels.

The restoring unit 130 may restore values of the plurality of pixels in a descending order of the generated priority.

Additionally, the restoring unit 130 may restore only a value of each of at least one pixel with a higher priority.

Referring to FIG. 7, a second image 710 may include structures 712 and 714, and a second hole region 716.

Images 720, 721, 722 and 730 may be generated by restoring the second image 710 based on priorities generated for a plurality of pixels.

To restore the second hole region 716, the restoring unit 130 may assign a priority to each of a plurality of pixels in the second hole region 716. A hole pixel adjacent to the structures 712 and 714 may be located in an edge of a structure with a high visual intensity. Accordingly, the restoring unit 130 may apply a weight to a priority for the hole pixel adjacent to the structures 712 and 714, and may assign the priority to the hole pixel.

The image 720 may be generated by preferentially restoring a hole pixel adjacent to the structure 712. In restoration, by restoring a hole pixel in the image 720, the restoring unit 130 may repeatedly update the priority. Additionally, the restoring unit 130 may update the priority by additionally using information of the restored hole pixel. For example, when the image 720 is generated, the restoring unit 130 may reassign the updated priority to the plurality of hole pixels.

A plurality of hole pixels may be restored. The plurality of hole pixels may be included in a patch. The restoring unit 130 may restore a value of a hole pixel, in a unit of the patch. For example, the restoring unit 130 may simultaneously or sequentially restore hole pixels in a single patch. Additionally, the restoring unit 130 may restore a value of a hole pixel in a unit of a patch, based on a priority.

A boundary of a hole region may be changed every time the hole region is restored in a unit of a patch. Accordingly, the restoring unit 130 may reassign a priority to each of a plurality of hole pixels, every time the plurality of hole pixels are restored. An amount of an operation required to restore a second hole region to a second image, that is, a downscaled image may be less than an amount of an operation required to restore a first hole region to a first image. That is, the processing load or number of operations required to restore the downscaled second hole region of the second image may be less than the processing load or number of operations required to restore the first hole region of the first image.

The image 721 may be generated by restoring a hole pixel adjacent to the structure 714. For example, the image 721 may be generated after image 720 is obtained.

The generated image 721 may not include a hole pixel adjacent to a structure. When a hole pixel adjacent to a structure does not exist, the restoring unit 130 may restore the hole pixel based on coordinates of a pixel. For example, the restoring unit 130 may assign a higher priority to a hole pixel that has a lower x-coordinate value and a higher y-coordinate value, among a plurality of hole pixels in the image 721. The restoring unit 130 may restore the hole pixel with the higher priority, and may generate the image 722. For example, the image 722 may be generated after image 721 is obtained.

Similarly, the image 730 may be generated by restoring the second hole region 716 based on a priority. The image 730 may be connected to the structures 712 and 714. For example, the image 730 may be generated after image 722 is obtained.

Conversely, images 740, 741, 742, and 750 may be generated when the restoring unit 130 restores the second image 710 without a priority for each of a plurality of pixels in the second image 710. The restoring unit 130 may restore a hole pixel in the second image 710, regardless of the structures 712 and 714. For example, the images 740 to 750 may be generated by restoring, first, a hole pixel with a lower x-coordinate value and a higher y-coordinate value among a plurality of hole pixels in the second image 710, or by restoring the plurality of hole pixels in a predetermined order.

The image 730 generated by assignment of priorities may provide a visual sensitivity, that is, may be naturally matched to a region adjacent to the structures 712 and 714, compared to the image 750 generated without assignment of priorities. In an alternative embodiment, some of the images may be generated without a priority, and some of the images may be generated with regard to a priority and/or with regard to structures 712 and 714, to restore the second image 710.

Figure 8:
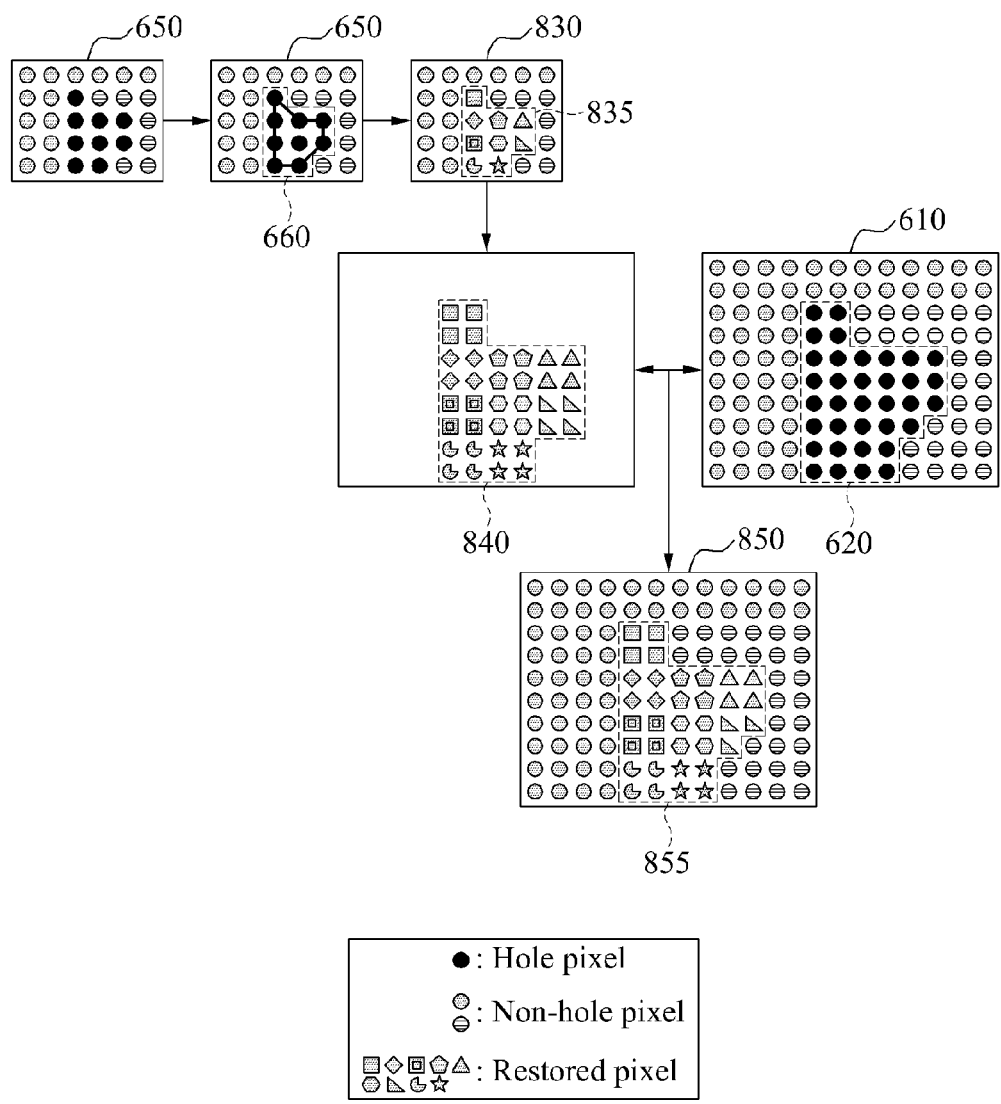
FIG. 8 illustrates a diagram of a third image generated based on an upscaled hole region according to example embodiments.

FIG. 8 illustrates a diagram of a third image generated based on an upscaled hole region according to example embodiments.

Referring to FIG. 8, the second image 650 may include the second hole region 660.

A second image 830 restored by the restoring unit 130 may include a restored second hole region 835.

The scale converter 120 may upscale the restored second image 830. The scale converter 120 may upscale only a portion of the restored second image 830. For example, the scale converter 120 may upscale only the restored second hole region 835 to a scale of the first hole region 620. Alternatively, the scale converter 120 may upscale portions or all of the restored second image 830.

The blending unit 140 may generate a third image 850, based on an upscaled second hole region 840 and the first image 610.

The third image 850 may include a first hole region 855 restored by setting a value of a second pixel in the upscaled second hole region 840 to a value of a third pixel in the first hole region 620. For example, the blending unit 140 may set the value of the second pixel in the upscaled second hole region 840 to the value of the third pixel in the first hole region 620, and may generate the third image 850. The third image 850 may include the first hole region 855 restored by the setting.

The second pixel and the third pixel may correspond to each other. Corresponding pixels may refer to pixels having the same coordinate values in an image or in a hole region. For example, coordinate values of the second pixel in the upscaled second hole region 840 may be identical to coordinate values of the third pixel in the first hole region 620.

Figure 9:
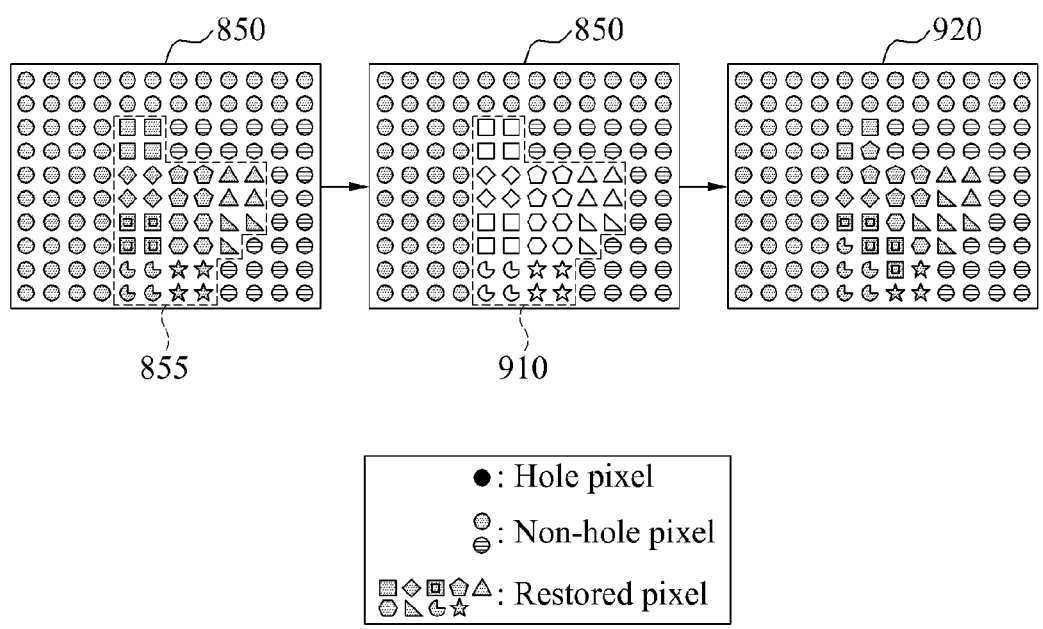
FIG. 9 illustrates a diagram of an updated third image according to example embodiments.

FIG. 9 illustrates a diagram of an updated third image according to example embodiments.

The above-described third image 850 may not include a hole pixel. However, a resolution of the restored first hole region 855 of the third image 850 may be lower than a resolution of a region located around the first hole region 855. Accordingly, the image updating unit 150 may use a scheme of increasing the resolution of the restored first hole region 855.

To increase a resolution of the third image 850, the image updating unit 150 may adjust a value of a third pixel in the restored first hole region 855. The image updating unit 150 may update the third image 850 by adjusting the value of the third pixel in the restored first hole region 855.

The image updating unit 150 may designate a restored region in the third image 850 to be an updated region 910. The updated region 910 may be identical to the first hole region 620, or the restored first hole region 855. Additionally, the updated region 910 may include a pixel that is not a hole pixel, but that has a value required to be updated.

The image updating unit 150 may set a first block including a third pixel in the updated region 910. The first block may have a size of "n×n." A central pixel in the first block may be, for example, a pixel in a boundary of the updated region 910. Additionally, n may be an integer that is equal to or greater than "1."

The image updating unit 150 may search for a second block most similar to the first block from a predetermined search range.

In an example, the second block may refer to a block with a smallest difference from red, green and blue (RGB) values of pixels in the first block. In another example, the second block may refer to a block with a pattern that is most similar to a pattern of RGB values of pixels in the first block. The image updating unit 150 may search for similar blocks, based on similarity of RGB values between pixels in blocks, or similarity of a pattern of RGB values between pixels in blocks.

The predetermined search range may include, for example, a region adjacent to the first block, a region spaced apart from the first block by a distance that is equal to or less than a predetermined value, or all regions of the third image 850.

The image updating unit 150 may update a value of the third pixel in the updated region 910, based on the found second block.

The updating of the third image 850 may refer to setting a value of a third pixel in the first block to a value of a pixel in the second block. A position of the third pixel in the first block may be identical to a position of the pixel in the second block.

Unlike the restoration of the second hole region as described above with reference to FIG. 7, the image updating unit 150 may update the third image 850, regardless of structure priority information of the first image. Unlike restoration of a hole pixel in the second hole region, the third pixel in the updated region 910 may include a characteristic of a structure of a background region. When the hole pixel in the second hole region is restored, the third pixel in the updated region 910 may include the characteristic of the structure of the background region. Accordingly, the characteristic of the structure of the background region may be maintained in a third image 920 with an updated pixel, even when the structure priority information is not reflected.

The updated third image 920 and the updated third pixel may have the same or substantially similar resolutions as a resolution of the background region of the first image 610.

Additionally, the image updating unit 150 may detect a pixel with a restoration error from the updated third image 920, and may improve the detected pixel.

A method of detecting a pixel with a restoration error from the updated third image 920, and improving the detected pixel will be further described with reference to FIGS. 10 through 13 below.

Figure 10:
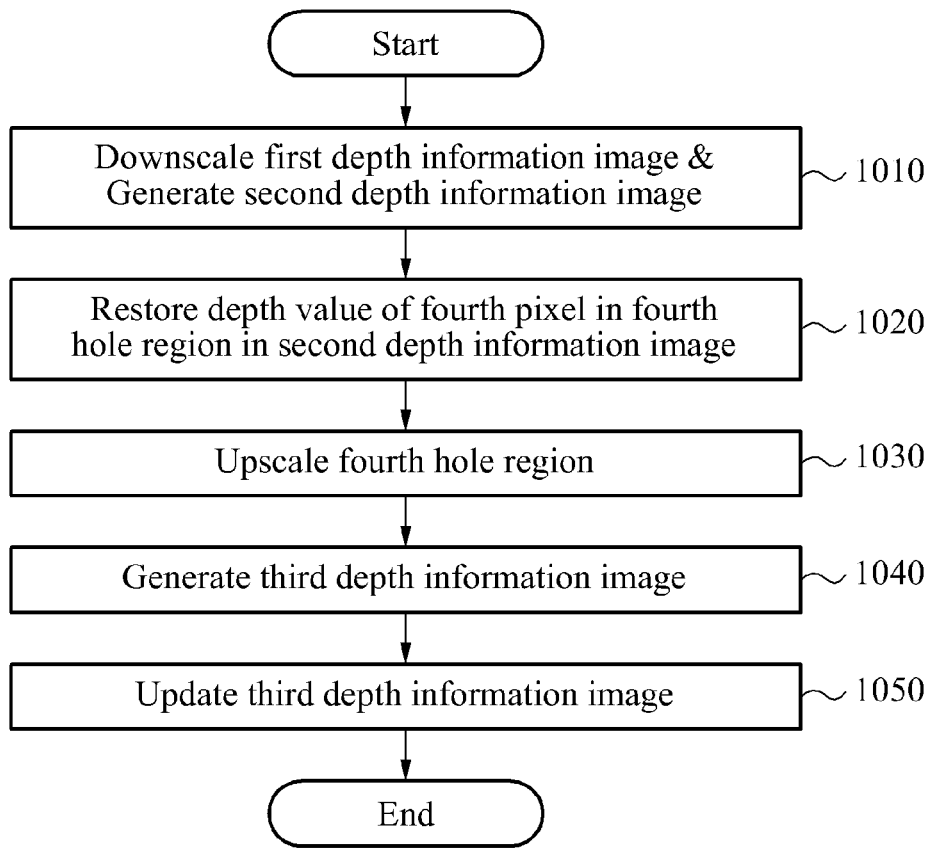
FIG. 10 illustrates a flowchart of an image processing method of processing a depth information image according to example embodiments.

FIG. 10 illustrates a flowchart of an image processing method of processing a depth information image according to example embodiments.

The image updating unit 150 may detect a pixel with a restoration error from a third image based on a first depth information image corresponding to a first image.

The above description of the first image in operations 220 through 260 of FIG. 2 may be applied to the first depth information image of operations 1010 through 1050 of FIG. 10. For example, in operations 220 through 260, the first image may be replaced by the first depth information image.

The above description of the second image in operations 220 through 260 may be applied to a second depth information image of operations 1010 through 1050. For example, in operations 220 through 260, the second image may be replaced by the second depth information image.

The above description of the third image in operations 220 through 260 may be applied to a third depth information image of operations 1010 through 1050. For example, in operations 220 through 260, the third image may be replaced by the third depth information image.

The above description of the value of the pixel in operations 220 through 260 may be applied to a depth value of operations 1010 through 1050. For example, in operations 220 through 260, the value of the pixel may be replaced by the depth value.

Referring to FIG. 10, in 1010, the scale converter 120 may downscale the first depth information image corresponding to the first image, for example, the first image 610, and may generate a second depth information image corresponding to the second image, for example, the second image 650.

The first depth information image may include a third hole region corresponding to the first hole region, for example, the first hole region 620. The third hole region may be converted to a fourth hole region in the second depth information image, by downscaling of the first depth information image.

In 1020, the restoring unit 130 may restore a depth value of a fourth pixel in the fourth hole region. The fourth pixel in the fourth hole region may correspond to a first pixel in the second hole region, for example, the second hole region 660.

In 1030, the scale converter 120 may upscale the fourth hole region to a scale of the third hole region.

In 1040, the blending unit 140 may set a depth value of a fifth pixel in the upscaled fourth hole region to a depth value of a sixth pixel in the third hole region, and may generate a third depth information image. The sixth pixel may correspond to the fifth pixel.

In 1050, the image updating unit 150 may update the third depth information image.

The image updating unit 150 may adjust a value of the sixth pixel in the third depth information image, and may update the third depth information image.

Operations 1010 through 1050 may be performed independently of operations 220 through 260. For example, operations 1010 through 1050 may be performed in parallel with operations 220 through 260. Alternatively, operations 1010 through 1050 may be performed sequentially with respect to operations 220 through 260.

Figure 11:
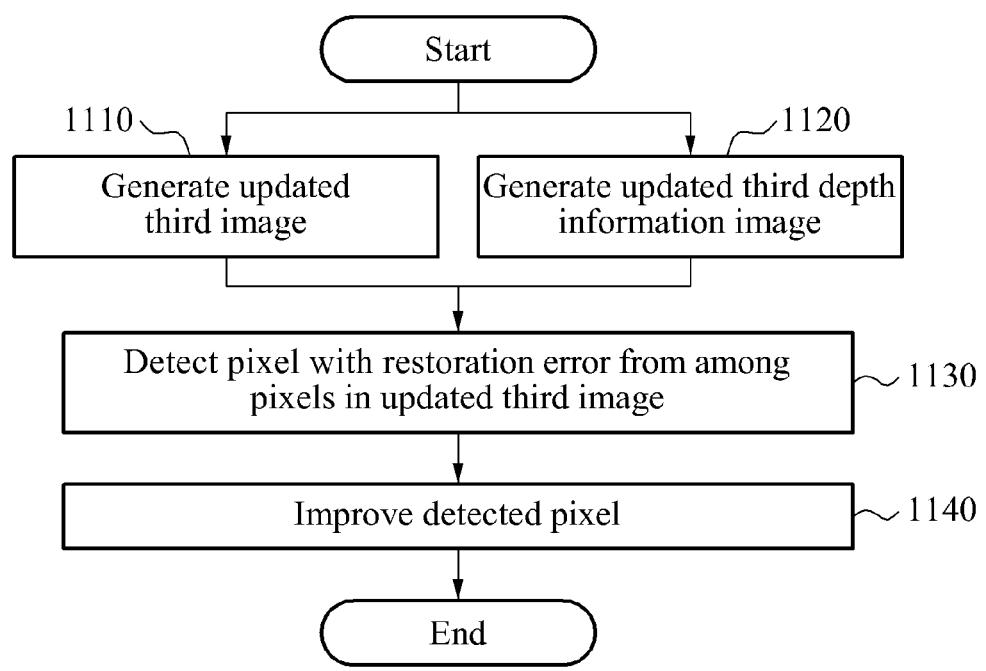
FIG. 11 illustrates a flowchart of a method of improving a pixel in a third image according to example embodiments.

FIG. 11 illustrates a flowchart of a method of improving a pixel in a third image according to example embodiments.

Operation 1110 may include operations 210 through 260 of FIG. 2.

Referring to FIG. 11, in 1110, the blending unit 140 may generate an updated third image, for example, the updated third image 920.

Operation 1120 may include operations 1010 through 1050 of FIG. 10.

In 1120, the blending unit 140 may generate an updated third depth information image.

In 1130, the restoration error detector 160 may detect a pixel with a restoration error from among pixels in the updated third image, based on the updated third depth information image.

The restoration error detector 160 will be further described with reference to FIGS. 12 and 13 below.

In 1140, the restoration error improving unit 170 may improve the detected pixel.

The restoration error improving unit 170 will be further described with reference to FIG. 13 below.

Figure 12:
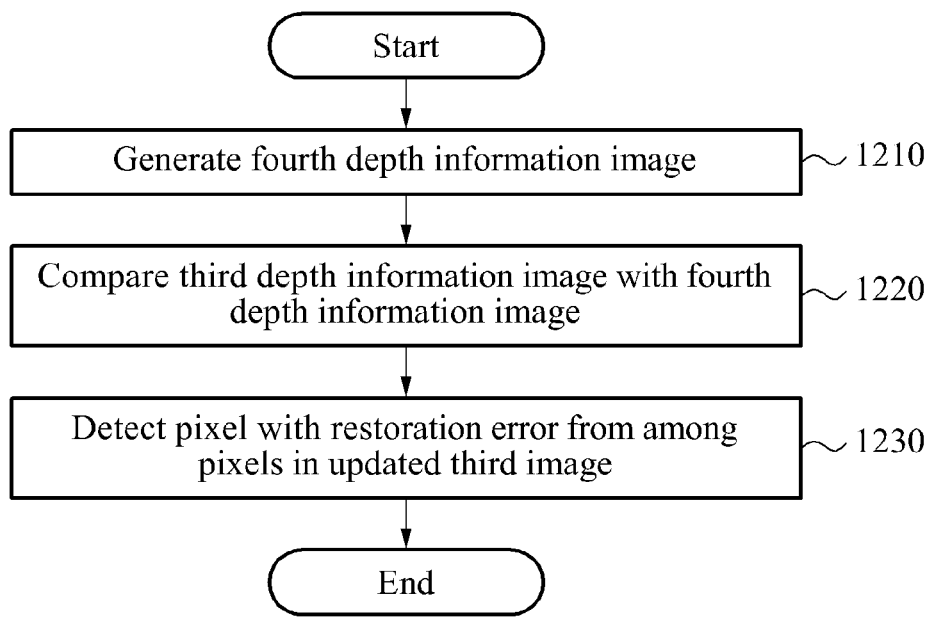
FIG. 12 illustrates a flowchart of a method of detecting a pixel with a restoration error from among pixels in a third image according to example embodiments.

FIG. 12 illustrates a flowchart of a method of detecting a pixel with a restoration error from among pixels in a third image according to example embodiments.

Detection of a pixel with a restoration error is described with reference to FIG. 12.

Referring to FIG. 12, in 1210, the restoration error detector 160 may generate a fourth depth information image.

When a background pixel, instead of a hole pixel, is located adjacent to a left side or a right side of a seventh pixel in a first hole region, for example, the first hole region 620, the restoration error detector 160 may set a depth value of an eighth pixel in the fourth depth information image to a depth value of the background pixel, and may generate the fourth depth information image. The eighth pixel may correspond to the seventh pixel. Coordinate values of the eighth pixel may be identical to coordinate values of the seventh pixel.

In 1220, the restoration error detector 160 may compare the third depth information image with the fourth depth information image.

The restoration error detector 160 may compare a depth value of a pixel in the third depth information image with a depth value of a pixel in the fourth depth information image. The compared pixels may correspond to each other, or may have the same coordinate values in the third depth information image and the fourth depth information image.

In 1230, the restoration error detector 160 may detect a pixel with a restoration error from among pixels in the updated third image, for example, the updated third image 920, based on a comparison between the third depth information image and the fourth depth information image.

For example, when a difference between the depth values of the pixels is determined to be equal to or greater than a predetermined value, the restoration error detector 160 may recognize coordinates of a pixel in the third depth information image.

The restoration error detector 160 may detect a pixel with the same coordinates as the recognized coordinates in the updated third image, as a pixel with a restoration error.

Figure 13:
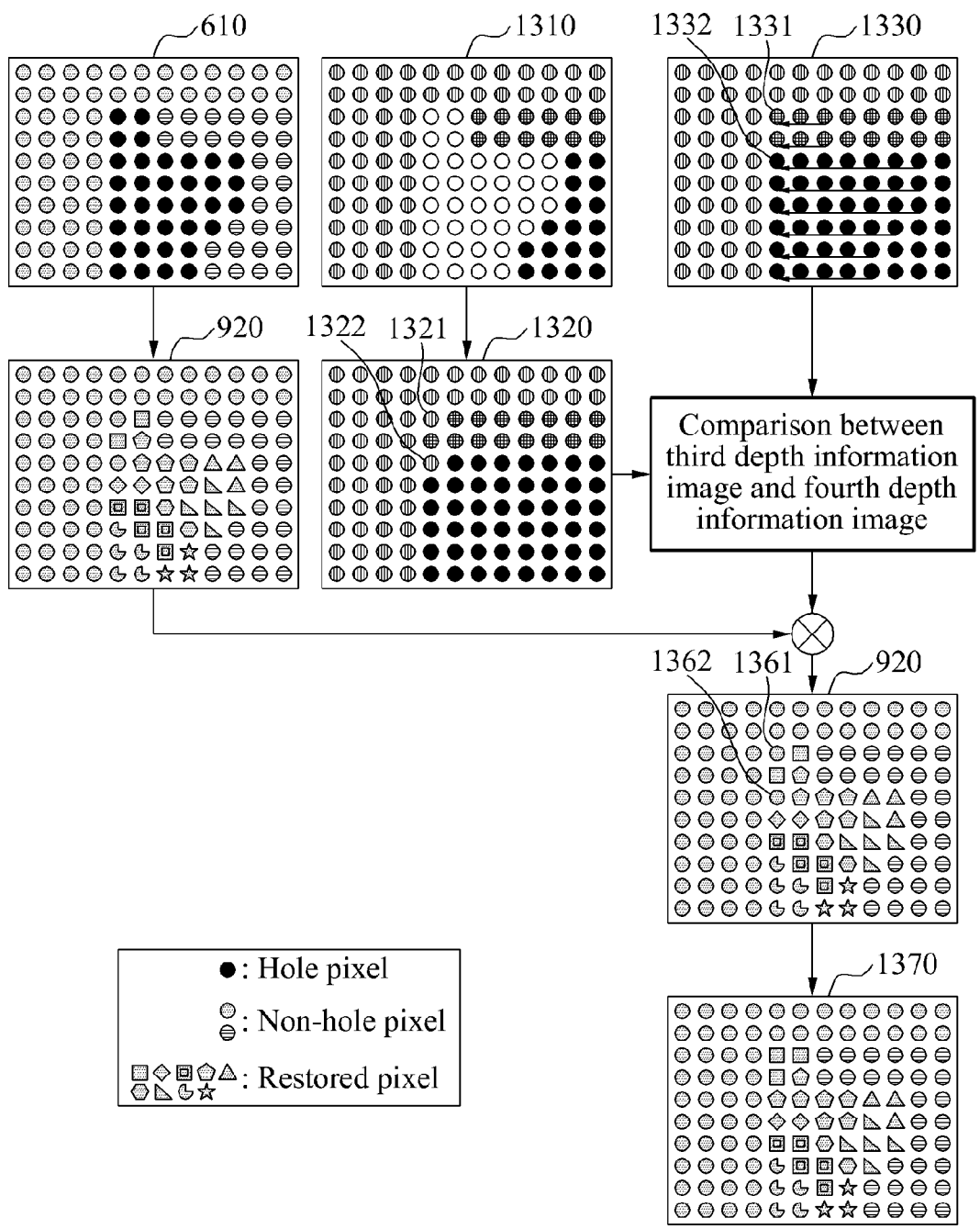
FIG. 13 illustrates a diagram of a third image in which a pixel with a restoration error is improved according to example embodiments.

FIG. 13 illustrates a diagram of a third image in which a pixel with a restoration error is improved according to example embodiments.

Hereinafter, an operation of generating an improved third image 1370 will be described.

The image processing apparatus 100 may generate a first image 610, in 210 of FIG. 2. The image processing apparatus 100 may perform operations 220 through 260 of FIG. 2 based on the generated first image 610, and may generate an updated third image 920.

For example, the updated third image 920 may be generated in 1110 of FIG. 11.

The image processing apparatus 100 may generate a first depth information image 1310 in 210. The image processing apparatus 100 may perform operations 1010 through 1050 of FIG. 10, based on the generated first depth information image 1310, and may generate an updated third depth information image 1320.

For example, the updated third depth information image 1320 may be generated in 1120 of FIG. 11.

The image processing apparatus 100 may generate a fourth depth information image 1330.

The image processing apparatus 100 may compare the updated third depth information image 1320 with the fourth depth information image 1330.

The image processing apparatus 100 may detect a pixel with a restoration error from among pixels in the updated third image 920, based on a comparison between the updated third depth information image 1320 and the fourth depth information image 1330.

In the comparison between the updated third depth information image 1320 and the fourth depth information image 1330, a difference between a depth value of a pixel 1321 in the updated third depth information image 1320 and a depth value of a pixel 1331 in the fourth depth information image 1330 may be equal to or greater than a predetermined value. The pixels 1321 and 1331 may correspond to each other. Similarly, a difference between a depth value of a pixel 1322 in the updated third depth information image 1320 and a depth value of a pixel 1332 in the fourth depth information image 1330 may be equal to or greater than a predetermined value. The pixels 1322 and 1332 may correspond to each other. If a difference between a depth value of a pixel in the updated third depth information image 1320 and a depth value of a pixel in the fourth depth information image is less than the predetermined value, it may be determined that the corresponding pixel in the updated third image 920 is not a pixel with a restoration error.

The image processing apparatus 100 may recognize coordinates of the pixel 1321.

The image processing apparatus 100 may apply the recognized coordinates to the updated third image 920, and may detect a pixel 1361 with the same coordinates as the recognized coordinates in the updated third image 920, as a pixel with a restoration error.

Through the same operation as described above, a pixel 1362 in the updated third image 920 may also be detected as a pixel with a restoration error.

The restoration error improving unit 170 of the image processing apparatus 100 may improve the detected pixel.

For example, the restoration error improving unit 170 may improve a value of the pixel 1361 and/or 1362. The restoration error improving unit 170 may replace the value of the pixel 1361 and/or 1362 by a value calculated based on values of background pixels adjacent to the pixel 1361 and/or 1362. The calculated value may be, for example, an average value or median value of the values of the background pixels adjacent to the pixel 1361 and/or 1362. Alternatively, the calculated value may be, for example, a maximum or minimum value of the values of the background pixels adjacent to the pixel 1361 and/or 1362.

The image processing apparatus 100 may improve the pixel 1361 and/or 1362, and may generate a fourth image 1370.

A number of times computation and arrangement of priorities to be generated during restoration of a hole region are repeatedly performed may be reduced by downscaling of a first image.

Technical information described above with reference to FIGS. 1 to 12 may equally be applied to one or more alternate and/or additional embodiments and accordingly, further descriptions thereof will be omitted.

The apparatuses and methods according to the above-described example embodiments may use one or more processors. For example, a processing device may be implemented using one or more general-purpose or special purpose computers, such as, for example, a processor, a controller and an arithmetic logic unit, a central processing unit (CPU), a graphics processing unit (GPU), a digital signal processor (DSP), a microcomputer, a field programmable array, a programmable logic unit, an application-specific integrated circuit (ASIC), a microprocessor or any other device capable of responding to and executing instructions in a defined manner.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. An image processing method, comprising:
   generating a second image by downscaling a first image which includes a first hole region, the first hole region being converted to a second hole region in the second image during the downscaling of the first image;
   restoring a value of a first pixel in the second hole region;
   upscaling the second hole region to a scale of the first hole region; and
   generating a third image by setting a value of a second pixel in the upscaled second hole region to a value of a third pixel in the first hole region, the third pixel having a coordinate value corresponding to a coordinate value of the second pixel.

2. The image processing method of claim 1, further comprising:
   updating the third image by adjusting the value of the third pixel.

3. The image processing method of claim 2, wherein the updating comprises:
   setting a first block comprising the third pixel;
   searching for a second block that is most similar to the first block from a predetermined search range; and
   updating the value of the third pixel based on the found second block.

4. The image processing method of claim 2, wherein the updating is performed regardless of structure priority information of the first image.

5. The image processing method of claim 2, further comprising:
   generating a second depth information image corresponding to the second image by downscaling a first depth information image corresponding to the first image, the first depth information image including a third hole region corresponding to the first hole region, and the third hole region being converted to a fourth hole region in the second depth information image during the downscaling of the first depth information image;
   restoring a depth value of a fourth pixel in the second depth information image, the fourth pixel corresponding to the first pixel;
   upscaling the fourth hole region to a scale of the third hole region;
   generating a third depth information image by setting a depth value of a fifth pixel in the upscaled fourth hole region to a value of a sixth pixel in the third hole region, the sixth pixel corresponding to the fifth pixel;
   updating the third depth information image by adjusting the value of the sixth pixel; and
   detecting a pixel with a restoration error from among a plurality of pixels in the updated third image, based on the updated third depth information image.

6. The image processing method of claim 5, wherein the detecting comprises:
   determining whether a background pixel is located adjacent to a seventh pixel in the first hole region;
   setting a depth value of an eighth pixel in a fourth depth information image to a depth value of the background pixel based on the determining, the eighth pixel corresponding to the seventh pixel;
   comparing the third depth information image with the fourth depth information image; and
   detecting a pixel with a restoration error from among the plurality of pixels in the third image, based on a result of the comparing.

7. The image processing method of claim 6, further comprising:
   improving the detected pixel with the restoration error, wherein the improving comprises replacing a value of the detected pixel by a value calculated based on values of background pixels adjacent to the detected pixel.

8. The image processing method of claim 7, wherein the calculated value comprises an average value of the values of the background pixels.

9. The image processing method of claim 1, further comprising:
   generating the first image based on at least one input image and a depth information image of the at least one input image,
   wherein a viewpoint of each of the at least one input image is different from a viewpoint of the first image.

10. The image processing method of claim 1, further comprising:
    generating the first image based on a plurality of input images and at least one depth information image,
    wherein the at least one depth information image is estimated based on the plurality of input images, and
    wherein a viewpoint of each of the plurality of input images is different from a viewpoint of the first image.

11. The image processing method of claim 1, wherein a plurality of first pixels are provided, and
    wherein the restoring comprises:
    generating a priority for each of the plurality of first pixels; and
    restoring values of the plurality of first pixels in a descending order of the priority.

12. The image processing method of claim 11, wherein the priority is determined based on at least one of a visual intensity of a structure comprising each of the plurality of first pixels, and a depth value of each of the plurality of first pixels.

13. The image processing method of claim 1, wherein a plurality of first pixels are provided,
    wherein the plurality of first pixels are comprised in a patch, and
    wherein the restoring comprises restoring a value of each of the plurality of first pixels in a unit of the patch.

14. A non-transitory computer readable recording medium storing a program to cause a computer to implement the image processing method of claim 1.

15. An image processing apparatus, comprising:
    at least one processor comprising:
    a memory having instructions stored thereon executed by the at least one processor to perform:
    generating a second image by downscaling a first image which includes a first hole region, and to upscale a second hole region in the second image to a scale of the first hole region, the first hole region being converted to the second hole region by the downscaling of the first image;
    restoring a value of a first pixel in the second hole region; and
    generating a third image by setting a value of a second pixel in the upscaled second hole region to a value of a third pixel in the first hole region, the third pixel having a coordinate value a corresponding to a coordinate value of the second pixel.

16. An image processing method, comprising:
    receiving an input image;

generating a first image having a viewpoint different from a viewpoint of the input image, the first image including a first hole region;

generating a second image by downscaling the first image and converting the first hole region to a second hole region;

restoring a second hole pixel in the second hole region based on background information of a background region disposed adjacent to the second hole region;

upscaling the second hole region in the second image; and generating a third image which includes the first hole region, wherein the first hole region of the third image is restored by changing a value of a first hole pixel in the first hole region of the third image to a value of an upscaled hole pixel in the upscaled second hole region, the upscaled hole pixel having a same coordinate value as the first hole pixel.

17. The image processing method of claim 16, wherein the restoring the second hole pixel comprises setting a priority for restoration for hole pixels in the second hole region, and restoring hole pixels in the second hole region according to the set priority and information of a structure of the background region.

18. The image processing method of claim 17, wherein the priority of the hole pixels in the second hole region is based on at least one of a depth value of the hole pixels in the second hole region and a visual intensity of a structure including the hole pixels in the second hole region.

19. The image processing method of claim 16, wherein only the second hole region is upscaled in the second image.

20. The image processing method of claim 16, further comprising:

increasing a resolution of the third image by adjusting a value of at least one pixel in the restored first hole region by changing a value of the at least one pixel in the restored first hole region to a value of a pixel disposed in a block of pixels in the third image.

* * * * *